United States Patent
Noguchi

(10) Patent No.: US 7,170,060 B2
(45) Date of Patent: Jan. 30, 2007

(54) PASSIVE INFRARED SENSOR

(75) Inventor: Michinori Noguchi, Otsu (JP)

(73) Assignee: OPTEX Co., Ltd., Shiga (JP)

( * ) Notice: Subject to any disclaimer, the term of this patent is extended or adjusted under 35 U.S.C. 154(b) by 162 days.

(21) Appl. No.: 11/064,485

(22) Filed: Feb. 24, 2005

(65) Prior Publication Data

US 2005/0205790 A1    Sep. 22, 2005

(30) Foreign Application Priority Data

Feb. 27, 2004  (JP)  ............ 2004-054378

(51) Int. Cl.
*G01J 5/02* (2006.01)
(52) U.S. Cl. ............... 250/353; 250/DIG. 1
(58) Field of Classification Search .......... 250/353, 250/DIG. 1

See application file for complete search history.

(56) References Cited

U.S. PATENT DOCUMENTS 4,709,151 A * 11/1987 Guscott et al. ............. 250/342
6,414,314 B1 * 7/2002 Ikeda .......................... 250/353

FOREIGN PATENT DOCUMENTS

| JP | 9-101376 | 4/1997 |
| JP | 2000-213985 | 8/2000 |
| JP | 3324271 | 7/2002 |

* cited by examiner

*Primary Examiner*—David Borta
*Assistant Examiner*—Mindy Vu
(74) *Attorney, Agent, or Firm*—Wenderoth, Lind & Ponack, L.L.P.

(57) ABSTRACT

According to one embodiment, a passive infrared sensor 1 includes an infrared sensing element 4, a pair of lenses 5R and 5L, and main mirrors 22R and 22L. A submirror 24R is disposed on the main mirror 22R. The submirror 24R is configured so that, with respect to the main mirror 22R, the orientation of the submirror 24R is changed by a first predetermined angle in regard to the horizontal direction in a direction away from an attachment surface 30 at the installation time, and the orientation of the submirror 24R is changed by a second predetermined angle in regard to the vertical direction in a direction downward at the installation time. A submirror 23L is disposed on the main mirror 22L. The submirror 23L is configured so that, with respect to the main mirror 22L, the orientation of the submirror 23L is changed by a first predetermined angle in regard to the horizontal direction in a direction away from the attachment surface 30 at the installation time, and the orientation of the submirror 23L is changed by a second predetermined angle in regard to the vertical direction in a direction downward at the installation time.

16 Claims, 6 Drawing Sheets

FIG.3(a)
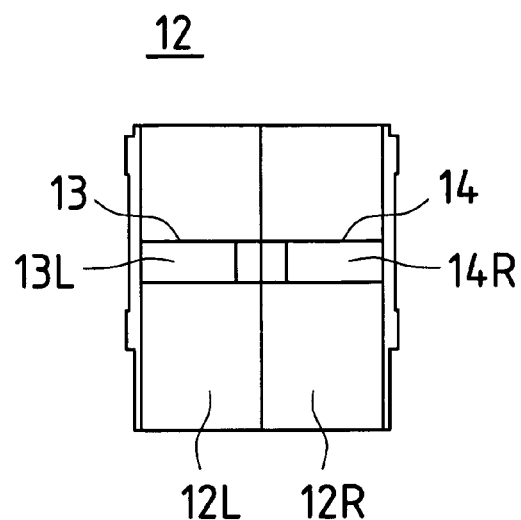
FIG.3(b)
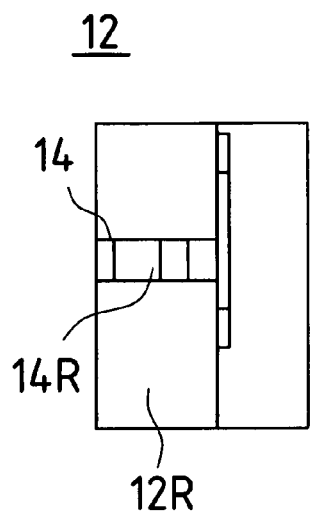
FIG.3(c)
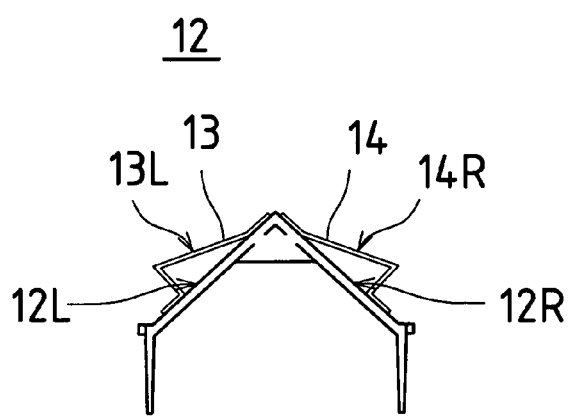
FIG.3(d) FIG.3(e)
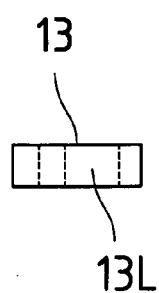 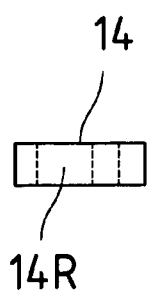

FIG.4(a)
FIG.4(b)
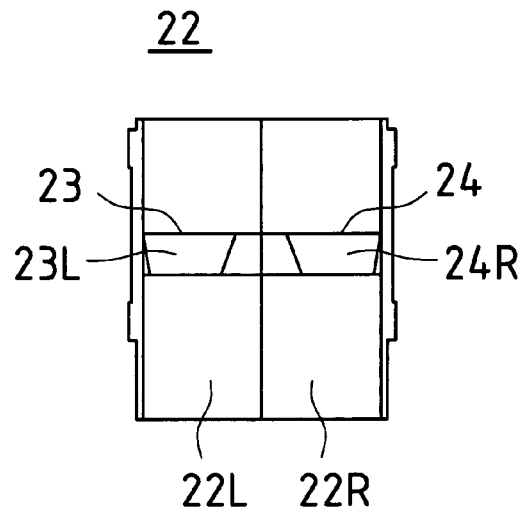
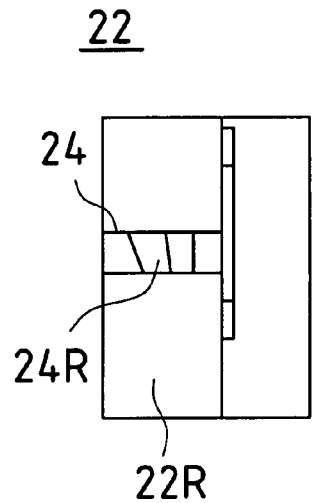
FIG.4(c)
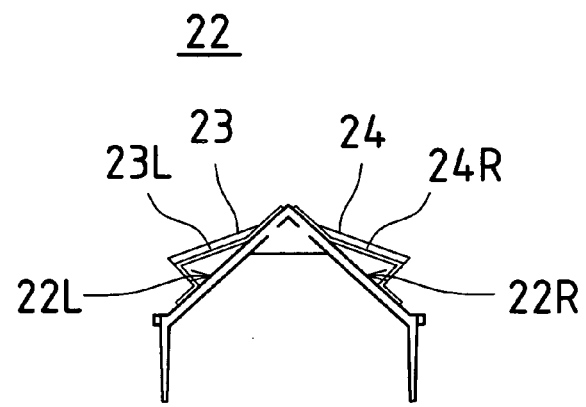
FIG.4(d)    FIG.4(e)
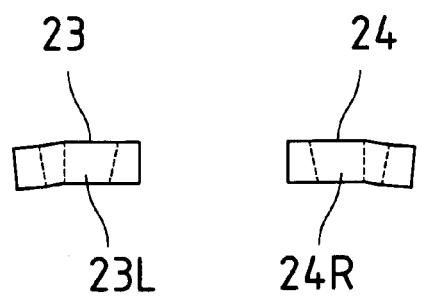

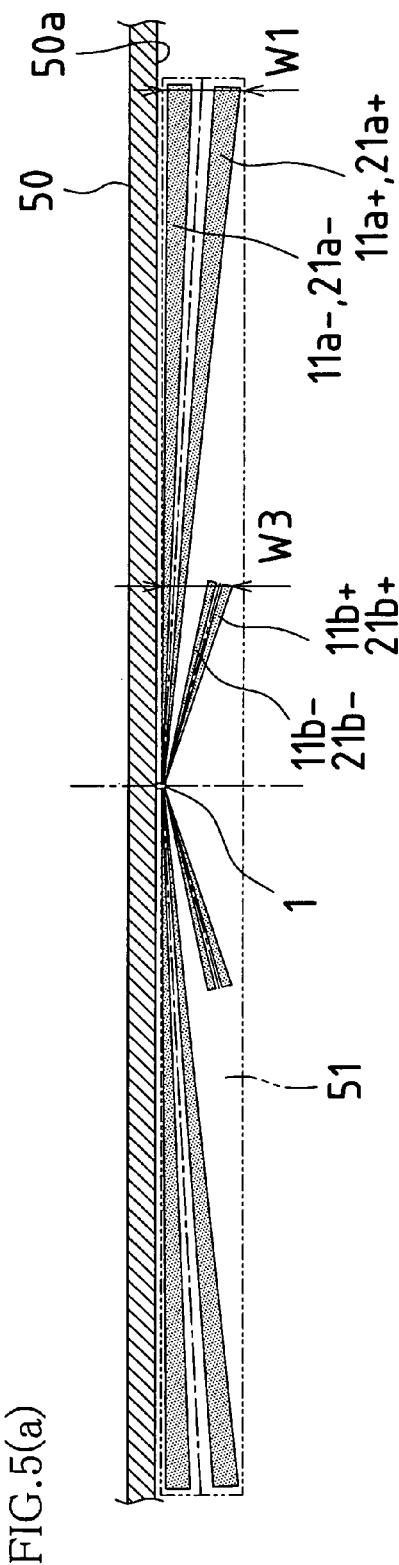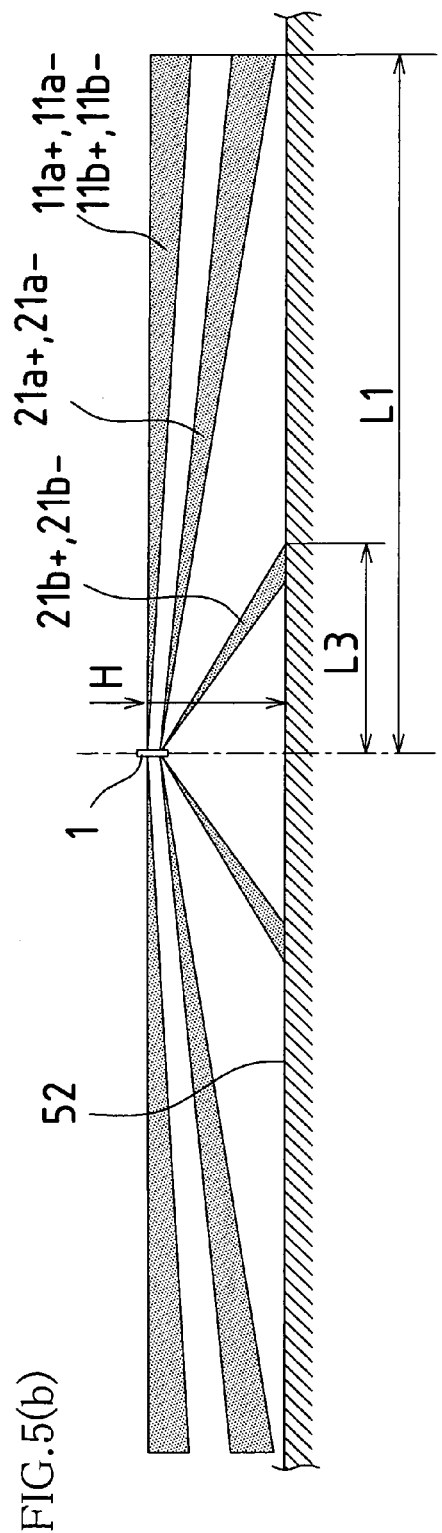
FIG.5(a)
FIG.5(b)

PASSIVE INFRARED SENSOR

CROSS-REFERENCE TO RELATED APPLICATION

This application claims the benefit of priority under 35 U.S.C. §119(a) from Patent Application No. 2004-54378 filed Feb. 27, 2004, in Japan, of which full contents are incorporated herein by reference.

BACKGROUND OF THE INVENTION

1. Field of Invention

The present invention relates to a passive infrared sensor that detects the presence of an intruder in a security area by receiving the infrared light that the intruder emits, and in particular to a passive infrared sensor that detects the presence of an intruder intruding through a wall or window of a building.

2. Conventional Art

Conventionally, in this type of passive infrared sensor, the infrared light emitted from a human body is collected by optical components and received by an infrared sensing element, and the angular range (i.e., the detection area) in which the sensor can collect the infrared light when seen in plan view from above is usually divided into plural pairs comprising pairs of pluses and minuses and set. Among passive infrared sensors, there is a "wide sensor", which is used for the purpose of detecting the presence of an intruder intruding into a wide space such as the interior of a room, and a "narrow sensor", which is used for the purpose of detecting the presence of an intruder intruding through a window or door facing a narrow hallway. In the case of the wide sensor, numerous (e.g., 5 to 9 pairs) angular ranges of the detection areas are set in consideration of the purpose of use. In the case of the narrow sensor, a small number (e.g., 1 to 2 pairs) of angular ranges of the detection areas are set. Below, the number of one pair of detection areas will be represented by a number.

The detection distance of the narrow sensor is usually set to be longer (1.5 to 2 times larger) than the detection distance of the wide sensor in consideration of the purpose of use. For this reason, with respect to the longest distance (called "rated distance" below) from the position of the sensor at which the sensor can detect a detection target (intruder) to the detection target, the focal length of the lens of the narrow sensor is made longer in comparison to the case of the wide sensor so that the width of the detection target and the widths of the detection areas are the same. There are also cases where the focal length of the lens is left as is, and the rated distance is made longer by increasing the area of the lens (one type of optical component) per one detection area to increase the amount of received light.

However, when the focal length of the lens of the narrow sensor is made longer, the size of the sensor becomes larger, which results in the sensor being conspicuous when it is disposed in a building or the like. Not only is the security effect compromised as a result of the presence of the sensor becoming more easily known to an intruder, but the sense of incongruity of the building increases. On the other hand, when the area of the lens is increased, the width of the detection area becomes wider. Thus, when the movement of an intruder is slow, sometimes the detection thereof becomes difficult. Detection can be facilitated with the design of circuits or the like, but this gives rise to a new problem in that it becomes easier for misdetection resulting from a disturbance or the like to occur.

A passive infrared sensor that can set substantially 180° opposing detection areas with one sensor has been proposed (e.g., see Japanese Patent Application Laid-Open Publication (JP-A) No. 2000-213985; referred to below as "Patent Document 1"). This passive infrared sensor is disposed with an infrared sensing element, a pair of optical components that set mutually substantially 180° opposing detection areas of the infrared sensing element, and a pair of mirrors that cause infrared light from the detection areas to enter the infrared sensing element. According to this passive infrared sensor, the focal length of the optical components can be reduced to ½ that of the conventional format, whereby the size of the passive infrared sensor can be reduced. When the passive infrared sensor is disposed at an intermediate position in a security area, the wiring is also facilitated.

When a passive infrared sensor is disposed outdoors, sometimes misdetection occurs due to a heat source distant from the detection area, direct sunlight, or a small animal entering the detection area, but a passive infrared human body detection apparatus that can reliably prevent such misdetection and detect with high precision only human bodies has been proposed (e.g., see JP-A No. 9-101376; referred to below as "Patent Document 2").

This passive infrared human body detection apparatus comprises two sensor units, each of which includes a light receiving element that converts incident infrared energy into an electrical signal corresponding to the fluctuation amount of the incident infrared energy and an optical system that collects infrared light and causes the infrared light to be made incident at the light receiving element. The sensor units set predetermined detection areas with the light receiving directions of the optical systems, and change the infrared energy emitted from within the detection areas to electrical signals corresponding to the fluctuation amounts of the infrared energy. The first sensor unit is disposed so that its light receiving direction faces the upper half of a human body to be detected and so that its detection area does not reach the ground. The second sensor unit is disposed so that its detection area is below the detection area of the first sensor unit and faces the ground separated by a predetermined detection distance from the second sensor unit's own disposed position. The passive infrared human body detection apparatus is also disposed with level detection circuits, which output detection signals when the electrical signals outputted from the light receiving elements of both sensor units exceed a predetermined level, and a human body detection circuit, which outputs a human body detection signal when the detection signals have been outputted from both level detection circuits. It is also disclosed that, in this passive infrared human body detection apparatus, the detection distance can be made to conform to the size of the security area by adjusting the vertical orientation of the second sensor unit.

As other prior art, a heat ray detection apparatus has also been proposed which, when plural detection areas with different focal lengths to detection positions are set, lenses with different focal lengths are used for each detection area, whereby the widths of the detection areas are made substantially the same regardless of the detection distance, and misdetection is reduced and reliability is raised (e.g., see Japanese Patent No. 3,324,271; referred to below as "Patent Document 3").

The above narrow sensors are suited for detecting the presence of an intruder intruding through a wall or window of a building, and there are also passive infrared sensors where the prior arts described in Patent Document 1 and Patent Document 2 are combined and used. The detection areas in this case are formed as shown in FIGS. 6(a) and 6(b), for example. Here, FIGS. 6(a) and 6(b) are schematic descriptive drawings of detection areas in an installation example of a passive infrared sensor 100. FIG. 6(a) is a plan view, and FIG. 6(b) is a front view. It will be noted that, because the detection areas are set to be bilaterally symmetrical around the disposed position of the passive infrared sensor 100, the detection areas at the right side of the passive infrared sensor 100 will be mainly described below.

As shown in FIGS. 6(a) and 6(b), the passive infrared sensor 100 is disposed at a position on a wall surface 50a at a height H (e.g., 0.8 to 1.2 m) from a ground 52 in the center of a narrow security area 51 along a wall 50. The passive infrared sensor 100 has two detection areas, an upper detection area and a lower detection area, each of which comprises one pair (+ or − will be added to reference numerals below) of divided areas in the horizontal direction. Upper detection areas 101+ and 101− are set facing the substantially horizontal direction from the passive infrared sensor 100. Lower detection areas 102+ and 102− are set facing slightly above the ground 52 at a position separated by a rated distance L1 from the passive infrared sensor 100. When these detection areas are seen in plan view, the detection areas 101+ and 102+ overlap, and the detection areas 101− and 102− similarly overlap. When the length of the security area 51 is short, e.g., when the distance from the passive infrared sensor 100 to the end of the security area 51 is a distance L2, the presence of an intruder in the security area 51 actually serving as the target can be more reliably detected by changing the lower detection areas 102+ and 102− so that they are set to face the vicinity of the ground 52 at a position of the distance L2 from the passive infrared sensor 100.

Even if the passive infrared sensor 100 is suitable when the width (where the widths of the pair of detection areas are combined) of the detection area at the end of the security area 51 is the detection width of the intruder, sometimes the width of the detection area becoming narrow becomes a problem at close range. For example, if L1=6 m and L2=2 m, the detection width is suitable if the width W1 of the detection area is 0.6 m at the end of the security area. However, the width W2 of the detection is 0.2 m at the distance L2, which is too small for the detection width, so that the detection performance drops. In order to reliably detect the presence of an intruder in such a case, the detection sensitivity of the passive infrared sensor 100 may be raised, but when this is done, there is the possibility to create the problem of a false alarm resulting from a disturbance or the like. It is also conceivable to add an infrared sensing element or an optical system and set a new detection area dedicated to close range, but this results in increases in the size and cost of the passive infrared sensor 100.

In the prior art of Patent Document 3, plural lenses with different focal lengths become necessary, and detection areas with appropriate widths can be set in accordance with the distance to an intruder, but the configuration becomes complicated, which results in increases in the size and cost of the sensor.

SUMMARY OF THE INVENTION

In view of the problems in the prior art, it is an object of the present invention to provide a passive infrared sensor that prevents a drop in detection performance in a close range region with a simple configuration, and in which there is little occurrence of a false alarm and which is highly reliable.

In order to achieve this object, one aspect of the invention provides a passive infrared sensor including: an infrared sensing element; a pair of optical components that set mutually substantially 180° opposing detection areas of the infrared sensing element; and a first main mirror and a second main mirror that cause infrared light from the detection areas to enter the infrared sensing element, wherein at least one first submirror with an orientation different from the orientation of the first main mirror is disposed on the first main mirror, with the first submirror being configured so that, in regard to the horizontal direction at the installation time of the passive infrared sensor, the orientation the first submirror is changed by a first predetermined angle, with respect to the orientation of the first main mirror, in a direction away from an attachment surface at the installation time, and in regard to the vertical direction at the installation time of the passive infrared sensor, the orientation the first submirror is changed by a second predetermined angle, with respect to the orientation of the first main mirror, in a direction downward at the installation time, and at least one second submirror with an orientation different from the orientation of the second main mirror is disposed on the second main mirror, with the second submirror being configured so that, in regard to the horizontal direction at the installation time of the passive infrared sensor, the orientation the second submirror is changed by a first predetermined angle, with respect to the orientation of the second main mirror, in a direction away from the attachment surface at the installation time, and in regard to the vertical direction at the installation time of the passive infrared sensor, the orientation the second submirror is changed by a second predetermined angle, with respect to the orientation of the second main mirror, in a direction downward at the installation time.

Here, the passive infrared sensor may be a narrow sensor suited for a narrow security area along a wall or window, for example, but the passive infrared sensor is not limited to this. The first submirror and the second submirror may be configured as separate members from the first main mirror and the second main mirror and respectively disposed on the first main mirror and the second main mirror. Alternatively, the first submirror and the second submirror may be integrally disposed on the first main mirror and the second main mirror.

According to the passive infrared sensor of this aspect of the invention, the mutually substantially 180° opposing detection areas set by the first main mirror and the second main mirror are optically divided by the presence of the first submirror and the second submirror. Namely, detection areas are added and set to the direction downward with respect to the original setting direction of the detection areas and away from the installation surface of the passive infrared sensor. This means that the number of detection areas is substantially increased only for close range, and in close range, the width from the installation surface of the passive infrared sensor is widened. In this manner, the detection performance in close range areas can be improved with a simple configuration change in the mirror portions. Also, because it is not particularly necessary to raise the detection sensitivity of the passive infrared sensor, a passive infrared sensor with high reliability can be realized without an increase in the occurrence of a false alarm or the like.

In order to achieve the above object, another aspect of the invention provides a passive infrared sensor including a first infrared sensing system and a second infrared sensing system, each of which includes: an infrared sensing element; a pair of optical components that set mutually substantially 180° opposing detection areas of the infrared sensing element; and a first main mirror and a second main mirror that cause infrared light from the detection areas to enter the infrared sensing element, with the first infrared sensing system setting a first detection area in a substantially horizontal direction and the second infrared sensing system setting a second detection area below the first detection area, wherein in the first infrared sensing system, at least one first submirror with an orientation different from the orientation of the first main mirror is disposed on the first main mirror, with the first submirror being configured so that, in regard to the horizontal direction at the installation time of the passive infrared sensor, the orientation the first submirror is changed by a first predetermined angle, with respect to the orientation of the first main mirror, in a direction away from an attachment surface at the installation time, and at least one second submirror with an orientation different from the orientation of the second main mirror is disposed on the second main mirror, with the second submirror being configured so that, in regard to the horizontal direction at the installation time of the passive infrared sensor, the orientation the second submirror is changed by a first predetermined angle, with respect to the orientation of the second main mirror, in a direction away from the attachment surface at the installation time, and in the second infrared sensing system, at least one first submirror with an orientation different from the orientation of the first main mirror is disposed on the first main mirror, with the first submirror being configured so that, in regard to the horizontal direction at the installation time of the passive infrared sensor, the orientation the first submirror is changed by a first predetermined angle, with respect to the orientation of the first main mirror, in a direction away from the attachment surface at the installation time, and in regard to the vertical direction at the installation time of the passive infrared sensor, the orientation the first submirror is changed by a second predetermined angle, with respect to the orientation of the first main mirror, in a direction downward at the installation time, and at least one second submirror with an orientation different from the orientation of the second main mirror is disposed on the second main mirror, with the second submirror being configured so that, in regard to the horizontal direction at the installation time of the passive infrared sensor, the orientation the second submirror is changed by a first predetermined angle, with respect to the orientation of the second main mirror, in a direction away from the attachment surface at the installation time, and in regard to the vertical direction at the installation time of the passive infrared sensor, the orientation the second submirror is changed by a second predetermined angle, with respect to the orientation of the second main mirror, in a direction downward at the installation time.

Here, the passive infrared sensor may be a narrow sensor suited for a narrow security area along a wall or window, for example, but the passive infrared sensor is not limited to this. In the first infrared sensing system that sets the first detection area in the substantially horizontal direction from the passive infrared sensor, the horizontal-direction orientations of the first submirror and the second submirror may be the same as, or substantially the same as, those of the first main mirror and the second main mirror.

According to the passive infrared sensor of this aspect of the invention, the first detection area set by the first infrared sensing system and the second detection area set by the second infrared sensing system are respectively optically divided. Namely, second detection areas are added and set to the direction downward with respect to the original setting direction of the second detection area and away from the installation surface of the passive infrared sensor. Moreover, first detection areas are added and set above the added and set second detection areas. This means that the number of detection areas is substantially increased only for close range, and in close range, the width from the installation surface of the passive infrared sensor is widened. Because the detection areas increased for close range are simultaneously present above and below, only a target having a determinate height can be detected. In this manner, the detection performance in close range areas can be improved with a simple configuration change in the mirror portions. Also, because it is not particularly necessary to raise the detection sensitivity of the passive infrared sensor, a passive infrared sensor with high reliability can be realized without an increase in the occurrence of a false alarm or the like.

The passive infrared sensor of the invention may be configured so that sensing signals are outputted when the first infrared sensing system senses infrared light equal to or greater than a predetermined value in the first detection area and the second infrared sensing system senses infrared light equal to or greater than a predetermined value in the second detection area.

According to this passive infrared sensor of the invention, detection signals can be outputted and a warning can be given only when a target having a determinate height intrude into a security area and infrared light equal to or greater than a predetermined value is sensed at the same time in the first detection area and the second detection area. Thus, false alarms can be reduced and the reliability of the passive infrared sensor can be raised in comparison to the case where sensing signals are outputted when infrared light is sensed in either one of the first detection area and the second detection area.

In the passive infrared sensor of the invention, the second infrared sensing system may be configured so that a setting direction of the second detection area is variable.

According to this passive infrared sensor of the invention, optimum detection areas can be set in accordance with the length of the security area. Thus, the presence of an intruder intruding into the security area actually serving as the target can be more reliably detected.

BRIEF DESCRIPTION OF THE DRAWINGS

FIG. 3(a) is a front view of a mirror unit disposed at an upper portion inside the passive infrared sensor associated with the embodiment of the invention.

FIG. 3(b) is a right side view of the same mirror unit.

FIG. 3(c) is a bottom view of the same mirror unit.

FIG. 3(d) is a schematic view of a member forming a left side-use submirror disposed at an upper portion inside the passive infrared sensor associated with the embodiment of the invention.

FIG. 3(e) is a schematic view of a member forming a right side-use submirror.

FIG. 4(a) is a front view of a mirror unit disposed at a lower portion inside the passive infrared sensor associated with the embodiment of the invention.

FIG. 4(b) is a right side view of the same mirror unit.

FIG. 4(c) is a bottom view of the same mirror unit.

FIG. 4(d) is a schematic view of a member forming a left side-use submirror disposed at a lower portion inside the passive infrared sensor associated with the embodiment of the invention.

FIG. 4(e) is a schematic view of a member forming a right side-use submirror.

FIG. 5(a) is a plan view describing detection areas in an installation example of the passive infrared sensor associated with the embodiment of the invention.

FIG. 5(b) is a front view describing the same detection areas.

DESCRIPTION OF THE PREFERRED EMBODIMENT

An embodiment of the invention will be described below with reference to the drawings.

Figure 1A:
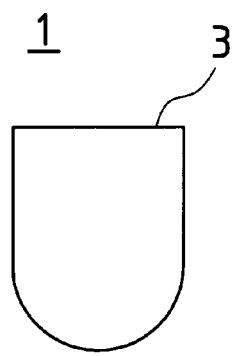
FIG. 1(a) is a plan view of the schematic configuration of a passive infrared sensor associated with an embodiment of the invention.
Figure 1C:
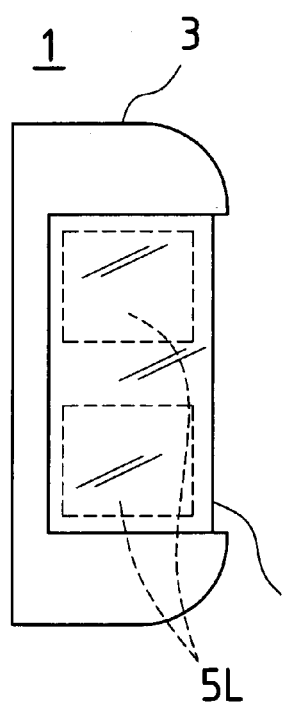
FIG. 1(c) is a left side view of the same.
Figure 1B:
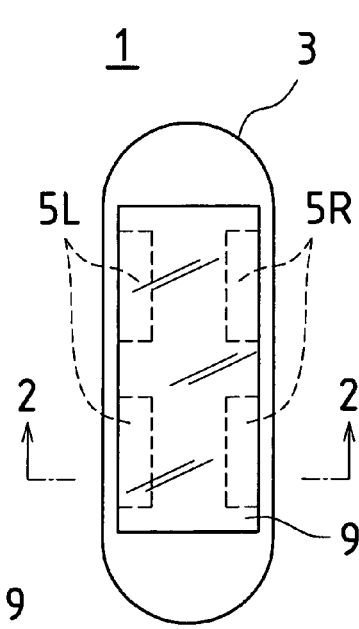
FIG. 1(b) is a front view of the same.
Figure 1D:
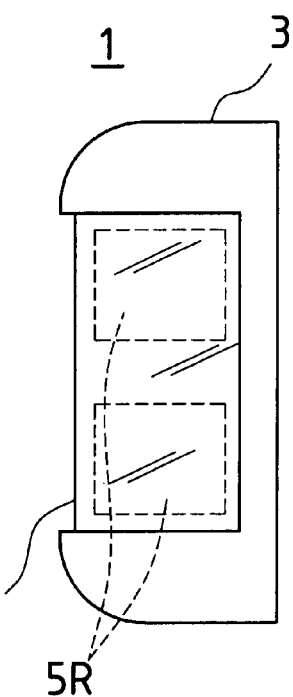
FIG. 1(d) is a right side view of the same.
Figure 2:
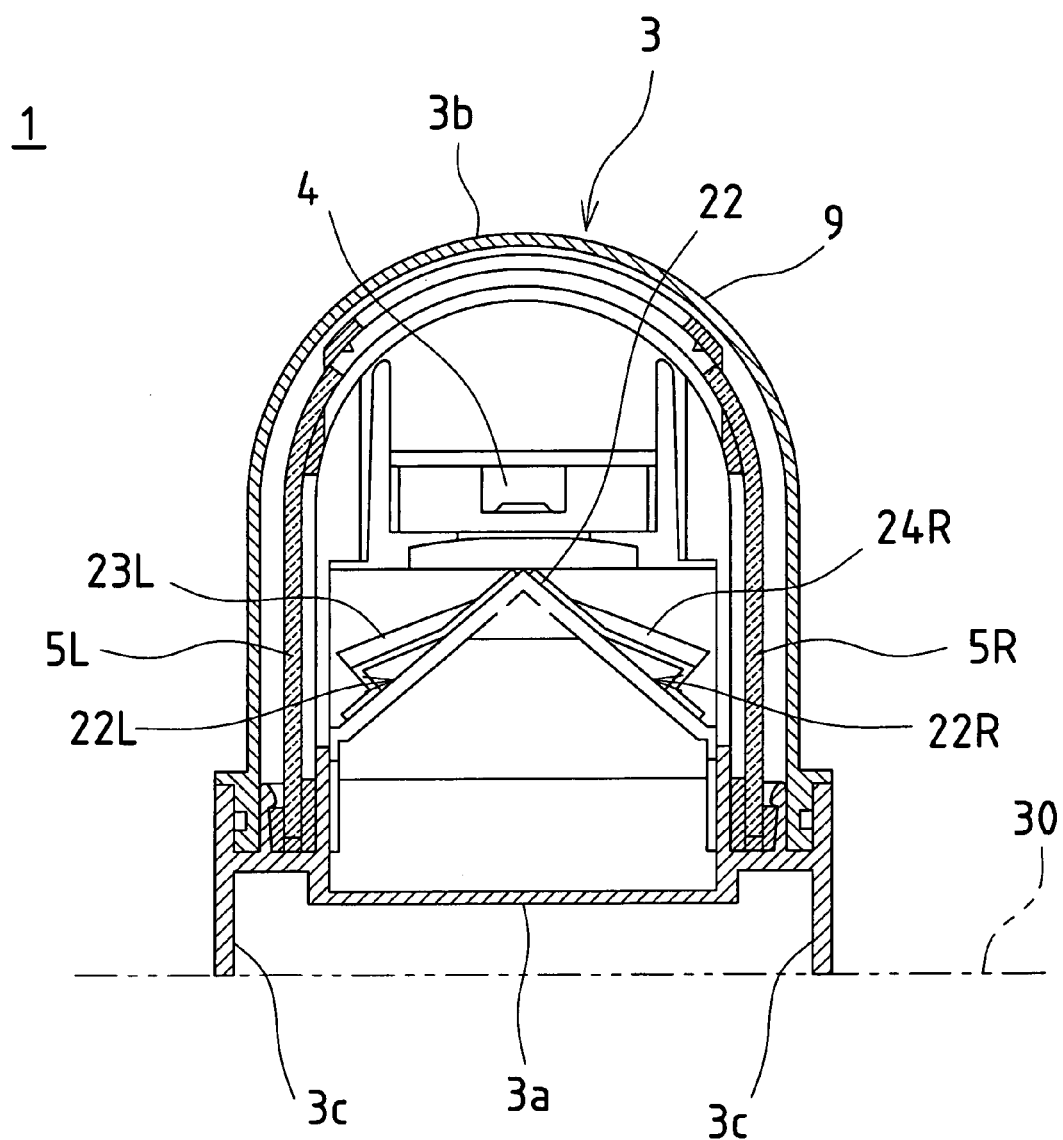
FIG. 2 is a cross-sectional view along line 2—2 of FIG. 1(b).

FIGS. 1(a) to 1(d) are schematic configural diagrams of a passive infrared sensor 1 associated with the embodiment of the invention. FIG. 1(a) is a plan view, FIG. 1(b) is a front view, FIG. 1(c) is a left side view, and FIG. 1(d) is a right side view. FIG. 2 is a cross-sectional view along line 2—2 of FIG. 1(b).

As shown in FIGS. 1(a) to (1d) and FIG. 2, in the passive infrared sensor 1, two infrared sensing systems are disposed at an upper portion and a lower portion of a case 3. FIG. 2 shows the lower infrared sensing system of these two infrared sensing systems.

The lower infrared sensing system is disposed with one infrared sensing element 4, a pair of lenses 5R and 5L that set mutually substantially 180° opposing detection areas when the infrared sensing element 4 is seen in plan view, and a mirror unit 22 that includes a pair of main mirrors 22R and 22L that cause infrared light from the detection areas to enter the infrared sensing element 4. Of these, the lenses 5R and 5L are disposed inside the side surface of a lens cover 9 that is fitted into a large open portion formed in the front surface of the case 3. The lenses 5R and 5L are fixed inside the case 3. The portions other than the lenses 5R and 5L of the lower infrared sensing system are retained so as to be movable in a predetermined range in the vertical direction inside the case 3 by an unillustrated mechanism. Thus, because their relative positional relationship with the lenses 5R and 5L can be changed, the setting direction of the detection areas resulting from the lower infrared sensing system can be changed in a determinate range (from the substantially horizontal direction to diagonally downward). The incident surface of the infrared sensing element 4 is oriented towards an attachment surface 30 to which the passive infrared sensor 1 is attached, and the infrared sensing element 4 is disposed in the vicinity of a top portion 3b opposite from a bottom portion 3a of the case 3. The mirror unit 22, which includes the main mirror 22R that reflects infrared light collected by the lens 5R and causes the infrared light to enter the infrared sensing element 4 and the main mirror 22L that reflects infrared light collected by the lens 5L and causes the infrared light to enter the infrared sensing element 4, is disposed between the bottom portion 3a and the infrared sensing element 4. Attachment portions 3c are formed at both ends of the bottom portion 3a (attachment surface side) of the case 3, and the passive infrared sensor 1 is attached to a wall or the like with interposition of these attachment portions 3c.

The upper infrared sensing system is substantially the same as the lower infrared sensing system except that in the upper infrared sensing system, the positional relationship with the lenses 5R and 5L is fixed and there is a difference in the mirror unit used. The difference in the mirror unit will be described later with reference to FIGS. 3(a) to 3(e) and FIGS. 4(a) to 4(e).

Similar to the prior art described in Patent Document 1, the infrared sensing element 4 comprises a pair of rectangular elements (not shown) that correspond to the horizontally-arranged pair of divided detection areas through the lenses 5R and 5L. Both rectangular elements are configured to sense infrared light to obtain outputs of mutually opposite polarities. Thus, the detection sensitivity of the rectangular elements of the passive infrared sensor 1 is improved with respect to a detection target successively crossing the detection areas projected by the lenses 5R and 5L.

Usually, an infrared sensing element has the characteristic that its sensitivity is highest when a detection target with the same width as the width of the pair of detection areas projected by the optical systems crosses both detection areas with a frequency of about 1 Hz. Thus, misdetection can be reduced with respect to slow frequency temperature changes of the surface of the passive infrared sensor due to wind or the like. Also, the sensing of infrared light resulting from a disturbance inputted at substantially the same time to the pair of detection areas, as with outside light that can cause misdetection by the passive infrared sensor, is offset by both rectangles.

FIGS. 3(a) to 3(c) are three views of a mirror unit 12 disposed at the upper portion inside the passive infrared sensor 1 associated with the embodiment of the invention, and FIGS. 3(d) and 3(e) are schematic views of submirror members. FIG. 3(a) is a front view of the mirror unit 12, FIG. 3(b) is a right side view of the mirror unit 12, FIG. 3(c) is a bottom view of the mirror unit 12, FIG. 3(d) is a view of a left side-use submirror member 13, and FIG. 3(e) is a view of a right side-use submirror member 14. It will be noted that FIG. 3(a) is a view seen from the same direction as that of FIG. 1(b), FIG. 3(b) is a view seen from the same direction as that of FIG. 1(d), and FIG. 3(c) is a view seen from the same direction as that of FIG. 2.

As shown in FIGS. 3(a) to 3(c), the narrow plate-like submirror member 13 (see FIG. 3(d)) is disposed on the substantial center of a main mirror 12L of the mirror unit 12 so as to cross the main mirror 12L in a state where the submirror member 13 is alternately folded at three places. The submirror member 13 includes a submirror 13L that has a different orientation from that of the main mirror 12L of the mirror unit 12. Namely, the submirror 13L is configured so that a first predetermined angular orientation can be changed, with respect to the orientation of the main mirror 12L, in the direction of the infrared sensing element 4 (upward in FIG. 3(c); in the direction away from the attachment surface).

Similarly, the submirror member 14, which is bilaterally symmetrical with the submirror member 13, is disposed on the substantial center of a main mirror 12R of the mirror unit 12 so as to cross the main mirror 12R in a state where the submirror member 14 is alternately folded at three places. The submirror member 14 includes a submirror 14R that has a different orientation from that of the main mirror 12R of the mirror unit 12. Namely, the submirror 14R is configured so that a first predetermined angular orientation can be changed, with respect to the orientation of the main mirror 12R, in the direction of the infrared sensing element 4.

The submirrors 13L and 14R and the submirror members 13 and 14 are not limited to these shapes, dispositions and configurations. For example, plural submirrors may also be disposed on the main mirrors, and the main mirrors and the submirrors may be configured as the same members.

FIGS. 4(a) to 4(c) are three views of the mirror unit 22 disposed at the lower portion inside the passive infrared sensor 1, and FIGS. 4(d) and 4(e) are schematic views of submirror members. FIG. 4(a) is a front view of the mirror unit 22, FIG. 4(b) is a right side view of the mirror unit 22, FIG. 4(c) is a bottom view of the mirror unit 22, FIG. 4(d) is a view of a left side-use submirror member 23, and FIG. 4(e) is a view of a right side-use submirror member 24. It will be noted that FIG. 4(a) is a view seen from the same direction as that of FIG. 1(b), FIG. 4(b) is a view seen from the same direction as that of FIG. 1(d), and FIG. 4(c) is a view seen from the same direction as that of FIG. 2.

As shown in FIGS. 4(a) to 4(c), the narrow plate-like submirror member 23 (see FIG. 4(d)) is disposed on the substantial center of the main mirror 22L of the mirror unit 22 so as to cross the main mirror 22L in a state where the submirror member 23 is alternately folded at three places. The submirror member 23 includes a submirror 23L that has a different orientation from that of the main mirror 22L of the mirror unit 22. Namely, the submirror 23L is configured so that a first predetermined angular orientation can be changed, with respect to the orientation of the main mirror 22L, in the direction of the infrared sensing element 4 (upward in FIG. 4(c); in the direction away from the attachment surface), and so that a second predetermined angular orientation can be changed in the direction below the passive infrared sensor 1 (in the direction of the ground at the time of attachment).

Similarly, the submirror member 24 (see FIG. 4(e)), which is bilaterally symmetrical with the submirror member 23, is disposed on the substantial center of the main mirror 22R of the mirror unit 22 so as to cross the main mirror 22R in a state where the submirror member 24 is alternately folded at three places. The submirror member 24 includes a submirror 24R that has a different orientation from that of the main mirror 22R of the mirror unit 22. Namely, the submirror 24R is configured so that a first predetermined angular orientation can be changed, with respect to the orientation of the main mirror 22L, in the direction of the infrared sensing element 4, and so that a second predetermined angular orientation can be changed in the direction below the passive infrared sensor 1 (in the direction of the ground at the time of attachment).

The submirrors 23L and 24R and the submirror members 23 and 24 are not limited to these shapes, dispositions and configurations. For example, plural submirrors may also be disposed on the main mirrors, and the main mirrors and the submirrors may be configured as the same members.

Figure 6A:
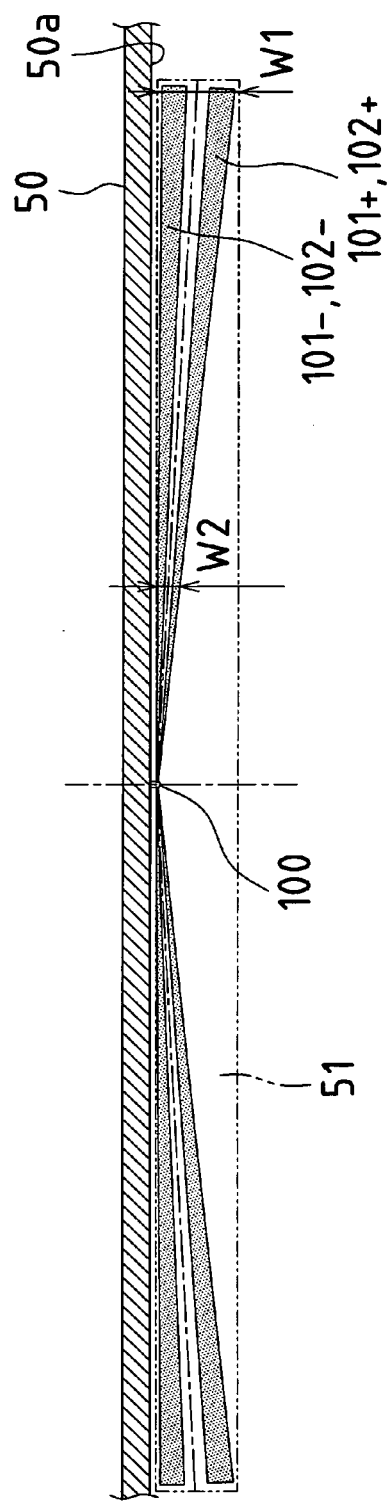
FIG. 6(a) is a plan view describing detection areas in an installation example of a conventional passive infrared sensor.
Figure 6B:
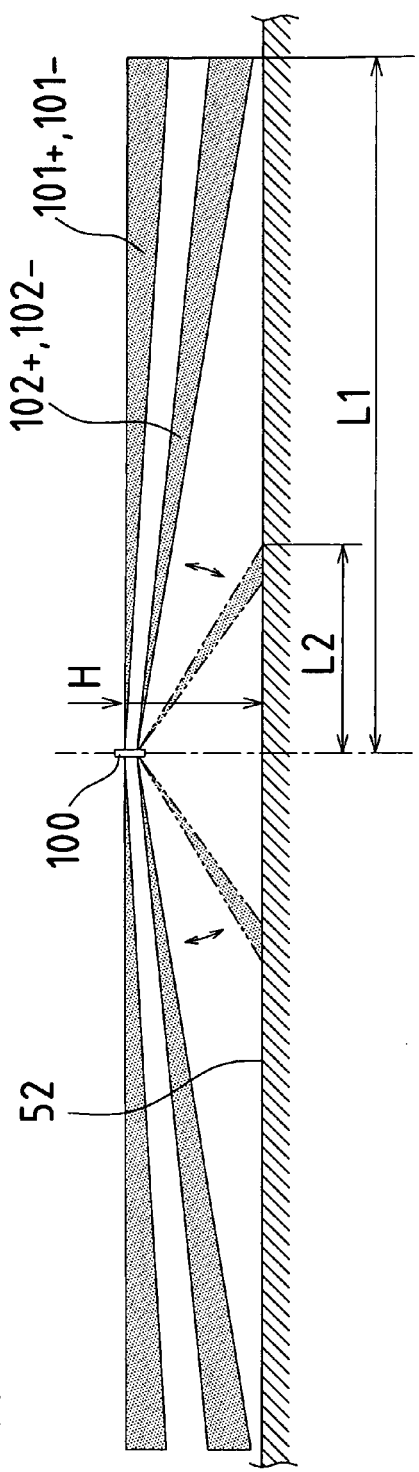
FIG. 6(b) is a front view describing the same detection areas.

Part of the upper detection area of the passive infrared sensor 1 is set, by the submirrors 13L and 14R described with reference to FIGS. 3(a) to 3(e), to a position different from that in the case of the prior art described with reference to FIGS. 6(a) and 6(b). Similarly, part of the lower detection area of the passive infrared sensor 1 is set, by the submirrors 23L and 24R described with reference to FIGS. 4(a) to 4(e), to a position different from that in the case of the prior art. In the description below, the detection areas set to different positions will be called sub-detection areas, and the detection areas set to the original positions will be called main detection areas.

FIGS. 5(a) and 5(b) are schematic descriptive views of detection areas in an installation example of the passive infrared sensor 1 associated with the embodiment of the invention. FIG. 5(a) is a plan view, and FIG. 5(b) is a front view. It will be noted that, because the detection areas are set to be bilaterally symmetrical around the disposed position of the passive infrared sensor 1, the detection areas at the right side of the passive infrared sensor 1 will be mainly described below.

As shown in FIGS. 5(a) and 5(b), the passive infrared sensor 1 is set at a position on a wall surface 50a at a height H from a ground 52 in the center of a narrow security area 51 along a wall 50. Here, description will be given in a case where the length of the security area is 12 m and the rated distance L1 of the passive infrared sensor 1 is 6 m, but the invention is not limited to these values. Also, the height H is ordinarily set to about 0.8 m to about 1.2 m assuming a human as an intruder, but the invention is not limited to this. The height H at which the passive infrared sensor 1 is disposed may be changed in accordance with the size of the primary detection target.

The detection areas of the passive infrared sensor 1 include an upper detection area formed by the infrared sensing system at the upper portion of the case 3 and a lower detection area formed by the infrared sensing system at the lower portion of the case 3, and each of these comprises one pair of divided areas in the horizontal direction.

The upper detection area is divided into main detection areas 11a+ and 11a− and sub-detection areas 11b+ and 11b−, and these are set to face the substantially horizontal direction from the passive infrared sensor 1. In plan view, the main detection areas 11a+ and 11a− are set substantially along the wall surface 50a, but the sub-detection areas 11b+ and 11b− are set by changing their orientation in the direction away from the wall surface 50a.

The lower detection area is also divided into main detection areas 21a+ and 21a− and sub-detection areas 21b+ and 21b−. The main detection areas 21a+ and 21a− are set to face slightly above the ground 52 at a position separated by the rated distance L1 from the passive infrared sensor 1, and set substantially along the wall surface 50a in plan view. The sub-detection areas 21b+ and 21b− are set to face the ground 52 at a position separated by a relatively close distance L3 (e.g., about 2 m) from the passive infrared sensor 1, and set by changing their orientation to the direction away from the wall surface 50a in plan view.

When seen in plan view, the upper main detection areas 11a+ and 11a− and the lower main detection areas 21a+ and 21a− respectively overlap, and the upper sub-detection areas 11b+ and 11b− and the lower sub-detection areas 21b+ and 21b− respectively overlap. Strictly speaking, the upper sub-detection areas 11b+ and 11b− are present at a longer distance than the lower sub-detection areas 21b+ and 21b−, but as described later, detection signals are not outputted during detection in only the upper detection areas. Thus, portions where the lower detection areas are not present become substantially invalid and are the same as where detection areas are not present. For this reason, in regard to the upper sub-detection areas 11b+ and 11b− also, FIG. 5(a) shows only portions where the lower detection areas are present.

Because the detection areas are disposed in this manner, the number of detection areas in a close range is substantially increased. Namely, in the area from the passive infrared sensor 1 to the distance L3, there are two upper detection areas and two lower detection areas, and the width of the overall detection area is substantially widened by these detection areas. The directions in which the upper sub-detection areas 11b+ and 11b− are set are determined by the orientation of the submirror 14R disposed on the main mirror 12R. The directions in which the lower sub-detection areas 21b+ and 21b− are set are determined by the orientation of the submirror 24R disposed on the main mirror 22R. Thus, the orientations of the submirrors 14R and 24R are determined so that the width W3 of the substantial detection area in the distance L3 becomes substantially equal to the width W1 (e.g., about 0.6 m) of the detection area at the end of the security area 51. Thus, the widths of the detection areas can be made substantially uniform not only with respect to long distances but also with respect to close distances. Therefore, because the width of the detection area can be retained at an appropriate value to detect the presence of an intruder regardless of the detection distance, it becomes possible to reliably detect the presence of the intruder. Also, because it is not particularly necessary to raise the detection sensitivity, problems such as occurrences of a false alarm increasing in accompaniment therewith do not arise.

Also, the passive infrared sensor 1 is configured to output detection signals and issue a warning only when the presence of an intruder is detected in both the upper and lower detection areas. Thus, misdetection is prevented as much as possible. Also, the setting directions of the lower detection areas are variable in a determinate range as described above. Thus, when the length of the security area 51 is short, for example, the setting directions of the lower detection areas are changed to face downward in accordance with the length of the security area 51, whereby the presence of an intruder in the security area 51 actually serving as a target can be more reliably detected. Also, in the above embodiment, in order for the detection areas to be optically divided, the submirrors 13L and 14R are respectively disposed on the main mirrors 12L and 12R, and the submirrors 23L and 24R are respectively disposed on the main mirrors 22L and 22R, but the invention is not limited to this configuration. For example, the detection areas may also be optically divided by configuring the lenses 5R and 5L with compound lenses.

The invention can be implemented in various other ways without departing from the spirit or principle features thereof. Thus, the preceding embodiment has been provided only for the purpose of illustration and should not be construed as limiting the invention. It is intended that the scope of the invention be defined by the following claims and not limited to the body of the specification. All modifications and changes belonging to an equivalent scope of the invention are included in the scope of the invention.

What is claimed is:

1. A passive infrared sensor comprising:
an infrared sensing element;
a pair of optical components that set mutually substantially 180° opposing detection areas of the infrared sensing element; and
a first main mirror and a second main mirror that cause infrared light from the detection areas to enter the infrared sensing element, wherein
at least one first submirror with an orientation different from the orientation of the first main mirror is disposed on the first main mirror, with the first submirror being configured so that, in regard to the horizontal direction at the installation time of the passive infrared sensor, the orientation the first submirror is changed by a first predetermined angle, with respect to the orientation of the first main mirror, in a direction away from an attachment surface at the installation time, and in regard to the vertical direction at the installation time of the passive infrared sensor, the orientation the first submirror is changed by a second predetermined angle, with respect to the orientation of the first main mirror, in a direction downward at the installation time, and
at least one second submirror with an orientation different from the orientation of the second main mirror is disposed on the second main mirror, with the second submirror being configured so that, in regard to the horizontal direction at the installation time of the passive infrared sensor, the orientation the second submirror is changed by a first predetermined angle, with respect to the orientation of the second main mirror, in a direction away from the attachment surface at the installation time, and in regard to the vertical direction at the installation time of the passive infrared sensor, the orientation the second submirror is changed by a second predetermined angle, with respect to the orientation of the second main mirror, in a direction downward at the installation time.

2. The passive infrared sensor of claim 1, wherein the passive infrared sensor is a narrow sensor.

3. The passive infrared sensor of claim 2, wherein the passive infrared sensor sets detection areas in a neighboring area along the passive infrared sensor installation surface.

4. The passive infrared sensor of claim 1, wherein the passive infrared sensor sets detection areas in a neighboring area along the passive infrared sensor installation surface.

5. A passive infrared sensor comprising a first infrared sensing system and a second infrared sensing system, each of which includes:
an infrared sensing element;
a pair of optical components that set mutually substantially 180° opposing detection areas of the infrared sensing element; and
a first main mirror and a second main mirror that cause infrared light from the detection areas to enter the infrared sensing element,
with the first infrared sensing system setting a first detection area in a substantially horizontal direction and the second infrared sensing system setting a second detection area below the first detection area, wherein
in the first infrared sensing system, at least one first submirror with an orientation different from the orientation of the first main mirror is disposed on the first main mirror, with the first submirror being configured so that, in regard to the horizontal direction at the installation time of the passive infrared sensor, the orientation the first submirror is changed by a first predetermined angle, with respect to the orientation of the first main mirror, in a direction away from an attachment surface at the installation time, and at least one second submirror with an orientation different from the orientation of the second main mirror is disposed on the second main mirror, with the second submirror being configured so that, in regard to the horizontal direction at the installation time of the passive infrared sensor, the orientation the second submirror is changed by a first predetermined angle, with respect to the orientation of the second main mirror, in a direction away from the attachment surface at the installation time, and
in the second infrared sensing system, at least one first submirror with an orientation different from the orientation of the first main mirror is disposed on the first main mirror, with the first submirror being configured so that, in regard to the horizontal direction at the installation time of the passive infrared sensor, the orientation the first submirror is changed by a first predetermined angle, with respect to the orientation of the first main mirror, in a direction away from the attachment surface at the installation time, and in regard to the vertical direction at the installation time of the passive infrared sensor, the orientation the first submirror is changed by a second predetermined angle, with respect to the orientation of the first main mirror, in a direction downward at the installation time, and at least one second submirror with an orientation different from the orientation of the second main mirror is disposed on the second main mirror, with the second submirror being configured so that, in regard to the horizontal direction at the installation time of the passive infrared sensor, the orientation the second submirror is changed by a first predetermined angle, with respect to the orientation of the second main mirror, in a direction away from the attachment surface at the installation time, and in regard to the vertical direction at the installation time of the passive infrared sensor, the orientation the second submirror is changed by a second predetermined angle, with respect to the orientation of the second main mirror, in a direction downward at the installation time.

6. The passive infrared sensor of claim 5, wherein sensing signals are outputted when the first infrared sensing system senses infrared light equal to or greater than a predetermined value in the first detection area and the second infrared sensing system senses infrared light equal to or greater than a predetermined value in the second detection area.

7. The passive infrared sensor of claim 6, wherein the second infrared sensing system is configured so that a setting direction of the second detection area is variable.

8. The passive infrared sensor of claim 7, wherein the passive infrared sensor is a narrow sensor.

9. The passive infrared sensor of claim 7, wherein the passive infrared sensor sets detection areas in a neighboring area along the passive infrared sensor installation surface.

10. The passive infrared sensor of claim 6, wherein the passive infrared sensor is a narrow sensor.

11. The passive infrared sensor of claim 10, wherein the passive infrared sensor sets detection areas in a neighboring area along the passive infrared sensor installation surface.

12. The passive infrared sensor of claim 5, wherein the second infrared sensing system is configured so that a setting direction of the second detection area is variable.

13. The passive infrared sensor of claim 12, wherein the passive infrared sensor is a narrow sensor.

14. The passive infrared sensor of claim 12, wherein the passive infrared sensor sets detection areas in a neighboring area along the passive infrared sensor installation surface.

15. The passive infrared sensor of claim 5, wherein the passive infrared sensor is a narrow sensor.

16. The passive infrared sensor of claim 15, wherein the passive infrared sensor sets detection areas in a neighboring area along the passive infrared sensor installation surface.

* * * * *